Dec. 31, 1935.　　　　E. MILLER　　　　2,025,820
TRACTOR HITCH MECHANISM
Filed June 27, 1934　　　2 Sheets-Sheet 1
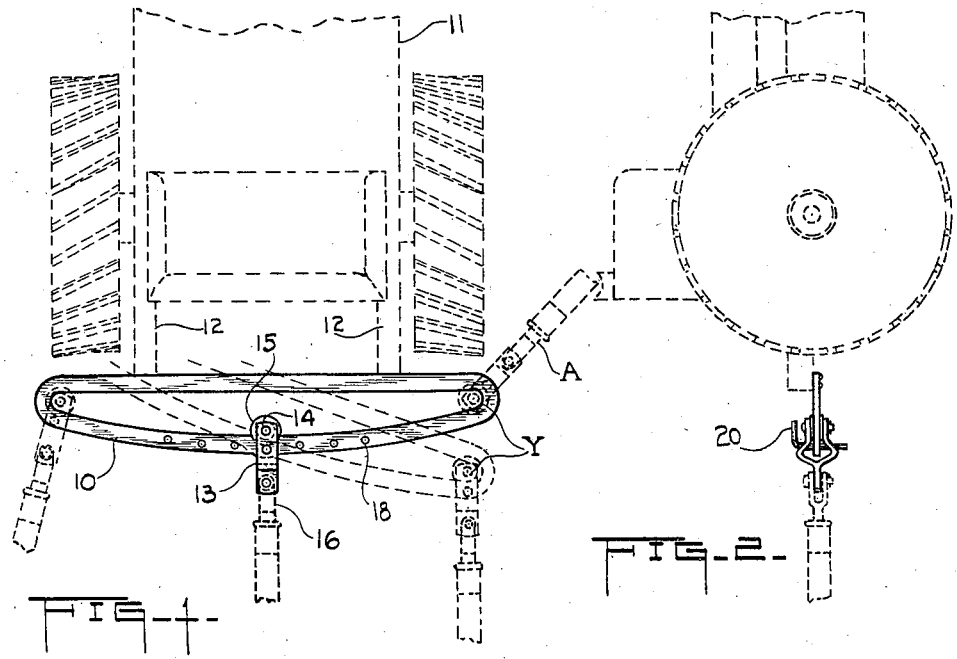
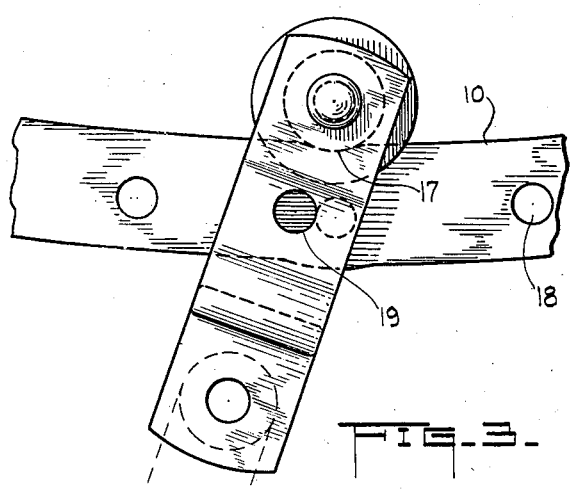
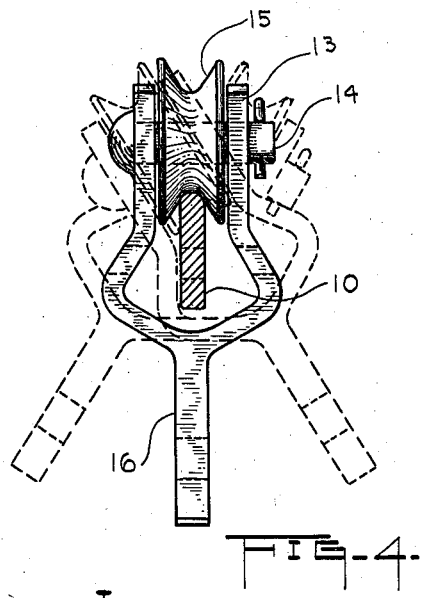
INVENTOR
Emil Miller
PER
Defft & Defft,
ATTY's.

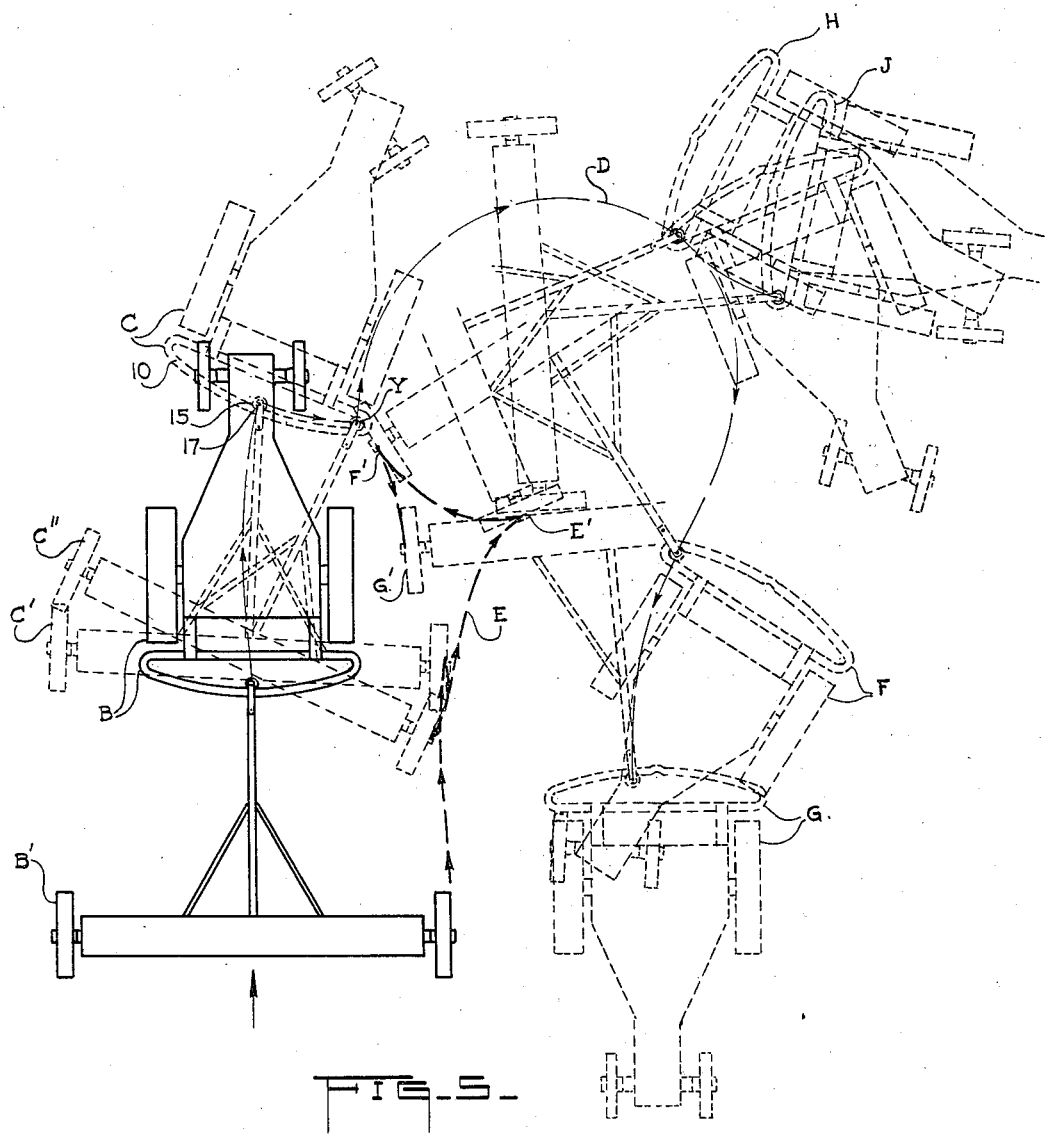

Patented Dec. 31, 1935

2,025,820

UNITED STATES PATENT OFFICE 2,025,820

TRACTOR HITCH MECHANISM

Emil Miller, Mackinaw, Ill.

Application June 27, 1934, Serial No. 732,608

1 Claim. (Cl. 280—33.44)

This invention relates to tractor hitches, more particularly to a hitch mechanism having special form adapting it to operate in a novel manner.

An object of the invention is to provide a tractor hitch mechanism of novel design, wherein is included means for operating a tractor and trailer in a substantially straight line or turning the same, in a manner to facilitate operation thereof in the field.

An additional object is to provide a mechanism as noted having means whereby the connection between the tractor and trailer is so devised that the respective machines may be run over rough ground and operated at various relative levels without undue stress on the connecting means.

I am aware that numerous devices of this class have been devised for the purpose of facilitating turning operation of tractor-trailer trains in the field and that the general idea of a curved bar in combination with a coupling element movable thereon is not new, however I herewith present a device having novel features, adapted to bring about a result not produced by any device of the kind known to me.

It is therefore my principal object to provide a tractor-trailer coupling device having means whereby turning operation of machines in the field may be accomplished with a minimum of power, time, lost motion and danger.

Other objects will appear in the following description and accompanying drawings in which;

Fig. 1 is a plan view showing my device as the same would be associated with a tractor.

Fig. 2 is a side elevational view of the parts shown in Fig. 1.

Fig. 3 is an enlarged fragmental view showing details of certain parts shown in Figs. 1 and 2.

Fig. 4 is a side elevational view of the mechanism shown in Fig. 3, and

Fig. 5 is a diagrammatic view, to be referred to, showing the principle of operation of my device when a tractor and trailer are made to turn in the field.

Fig. 1 discloses my invention as generally comprising an arcuate bar member 10, which is adapted to be attached to a tractor 11 by any convenient means such as members 12, which may be secured to the bar and to the tractor frame. The bar extends rearwardly of the tractor wheels as shown, and will hereafter be referred to as track 10.

Projecting on both sides of track 10 are the arms 13 of a clevis member which carry, by means of a pin 14, a suitably grooved or flanged wheel 15, and a rearwardly extending portion 16 of the clevis is adapted to connect the same with a rake, drill disk or any other device to be drawn.

It will be noted that the track portion of bar 10 is formed upon the line of a circle having a relatively long radius. For practical use I prefer to form this track upon a radius having its center at approximately a central position adjacent or forward of the front wheels of the tractor, although this may be modified without alteration of the principle of my invention.

It will also be noted that track 10 extends outwardly on either side to a point adjacent the outside line of the tractor, and that roller 15 may be moved to a position upon the track to a point adjacent the outside line of the tractor, which position is designated Y.

A recess 17, more clearly shown in Fig. 3, is disposed at a central point in the runway of track 10 and is adapted to receive the wheel 15 and retain the same in a central position when the tractor is pulling straight ahead.

The recess is so proportioned that a slight angular movement of the track 10, relative to the draft member 16, will permit escapement of the wheel 15 from the recess and the fashioning of the track is such that the said slight angular change in its position places the outer extremity of the track in a low position relative to the central portion whereby, when the track is moved angularly a sufficient amount to permit escapement of wheel 15 from recess 17, the wheel is immediately propelled to the position Y.

Dotted outline in Fig. 1 indicates the relative position of the track and wheel 15 when the tractor is turned a slight amount toward the right, wherein it will be noted that the wheel is so positioned that the point of application of the load is transferred to a point considerably within the line of any circle described by the tractor.

Additional dotted outline as at A indicates that when the wheel 15 is disposed at position Y it is so positioned relative to the body of the tractor as to permit extreme angular movements as between the tractor and trailer without danger of interference between the tractor mechanism and drawbar elements of the trailer.

Fig. 5 illustrates related movements of a tractor and trailer when a turning movement is made.

It is assumed that the train is progressing in a straight line in the direction of the arrow, with the relative positions of tractor and trailer designated B and B' respectively.

Continued progress of the train with an initial turning movement of the tractor will place the machines in the position indicated by C and C' in which position the angular position of track 10 is such as to permit escapement of wheel 15 from notch 17 and, the track-end now being the low point, immediate displacement of the wheel to an extreme inside position Y.

During the latter described movement of wheel 15 there has been substantially no forward movement of the trailer but there has taken place an angular movement as indicated in dotted outline C''.

From this point continued progress of the tractor upon a circular line will bring about movement of wheel 15 upon a line approximately represented by the arrowed line D, while at the same time the tractor is following a relatively large circular course.

It will be apparent that with wheel 15 following the line D, the inside wheel of the trailer will move over a course approximately represented by the arrowed line E, to eventually arrive at a point E' and begin a reverse movement during which the body of the trailer is revolving about its own center.

Continued progress of the tractor through positions F and G will place it in alignment to follow a path parallel and adjacent its former path and the relative movement of the trailer will be such that when the tractor arrives at position G the trailer will be in such position that continued progress of the tractor results in progress of the trailer in a line paralleling or overlapping its former path.

During progress of the tractor through positions F and G, its angular movement is such that the central point of track 10 again becomes a low point whereby wheel 15 is replaced at the center of the track in position for the pull straight ahead.

It is to be noted that the distance travelled by the tractor during progress from position B to position G is relatively long, while that travelled by the trailer is relatively short and that the large difference in the distances travelled is a result of shifting wheel 15 from central to Y position as explained in reference to position C.

Due to the difference in distances travelled, the tractor is given great advantage over the trailer and is thus enabled to accomplish a turning movement at relatively high speed with a minimum of effort.

It is further to be noted that, with the point of application of load disposed at Y, resistance of the load is applied at a point rearward and outward of the inside driving wheel of the tractor, in which relative position it is capable of acting somewhat in the manner of the rudder of a boat wherein forward progress of the inside wheel is resisted whereas, there being substantially no resistance applied adjacent the outside wheel, the power applied at the outer wheel is effective to assist, or actually induce, turning movement of the tractor.

The action described is of great assistance in practical operation of a tractor, especially when it is driven in loose soil. It is well known that great difficulty is often experienced in turning a tractor in loose soil, due principally to the tendency of the front wheels to skid in a direction straight ahead rather than follow a line in the direction of their turning. Further, when the load resistance is applied at a point intermediate the tractor driving wheels, the pull of the load is in direct opposition to turning movement, which further increases the difficulty of turning. With my device, as above noted, turning movement is assisted rather than resisted.

To more fully disclose the action of my device I show, in Fig. 5, dotted outlines H and J indicating the action when a partial turn is made. With the tractor in J position, moving toward a straight line at right angle with its original line of travel the trailer follows the line E to the point E', as already described, and reverse to a point which places it in proper alignment for progress down the field. It will be noted that the corner turned by the trailer is quite sharp.

The ability to accomplish sharp turns of any degree, is an important feature made possible by use of my device.

To further illustrate the utility of my hitch it may be said that it is particularly adapted for use in connection with tractors of the caterpillar type. It is well known that such tractors may be turned substantially upon their own centers. Due to the wide angularity of operation made possible by my device, as noted in connection with the position A, trailers of the road machinery type may be successfully operated within very close limits.

As an additional feature contributing to the successful use of my device I show in Fig. 4 a special form of clevis or yoke, already designated 13. The groove of wheel 15 is so fashioned that the wheel may be tilted relative to rail 10, and the arms of the clevis are so fashioned as to permit the tilting movement without contact of the arms with the rail.

In this manner I provide a connecting means between the tractor and trailer which permits considerable vertical angular movement between them without alteration of free running relation between wheel 15 and rail 10. The utility of this is especially noticeable when the machines are operated over rough ground.

In case it may be desired to provide a stationary, offset coupling between the machines, I provide a series of spaced apart holes 18 in track 10 and a hole 19 in the arms of clevis 13 adapted to register with the former. A pin 20, shown in Fig. 2, may be inserted in the holes to hold the clevis in various positions on the track.

The foregoing is thought to set forth my invention as a device whereby tractor machinery may be operated with a minimum of danger, time, fuel and wear.

What I claim:—

A tractor hitch mechanism secured to a tractor, comprising a continuous member having straight portions extending beyond the outer periphery of the wheels of the tractor, which portions are joined by a continuous track having a curvature equal to an arc struck from a point approximately midway between the steering elements of the tractor, a hitching element carried by the track and freely movable from end to end thereof, whereby sharp turns to either side of the straight line of pull may be made without said hitching element contacting any portion of the wheels of the tractor.

EMIL MILLER.